US009256425B2

(12) United States Patent
Baird et al.

(10) Patent No.: US 9,256,425 B2
(45) Date of Patent: Feb. 9, 2016

(54) VERSIONING AND REFACTORING OF BUSINESS MASHUPS IN ON-DEMAND ENVIRONMENTS

(75) Inventors: Kerstin Baird, Portland, OR (US); Thomas Clement, Oakland, CA (US); Rohit Jainendra, San Francisco, CA (US)

(73) Assignee: SERENA SOFTWARE, INC., San Mateo, CA (US)

( * ) Notice: Subject to any disclaimer, the term of this patent is extended or adjusted under 35 U.S.C. 154(b) by 1969 days.

(21) Appl. No.: 12/207,384

(22) Filed: Sep. 9, 2008

(65) Prior Publication Data

US 2010/0064277 A1    Mar. 11, 2010

(51) Int. Cl.
G06F 9/44 (2006.01)

(52) U.S. Cl.
CPC ... *G06F 8/72* (2013.01); *G06F 8/71* (2013.01)

(58) Field of Classification Search
CPC .............. G06F 8/20; G06F 8/36; G06F 8/65; G06F 8/71
USPC ................................................ 717/120, 121
See application file for complete search history.

(56) References Cited

U.S. PATENT DOCUMENTS

| 6,971,093 B1* | 11/2005 | Spring | 717/170 |
| 2007/0111185 A1* | 5/2007 | Krebs | 434/350 |
| 2008/0209400 A1* | 8/2008 | Parker et al. | 717/122 |
| 2009/0019426 A1* | 1/2009 | Baeumer et al. | 717/122 |
| 2009/0100407 A1* | 4/2009 | Bouillet et al. | 717/105 |
| 2009/0204594 A1* | 8/2009 | Akkiraju et al. | 707/5 |
| 2009/0249287 A1* | 10/2009 | Patrick | 717/107 |
| 2009/0328025 A1* | 12/2009 | Johnson et al. | 717/170 |

OTHER PUBLICATIONS

Dion Hinchcliffe, "The 10 top challenges facing enterprise mashups", Oct. 16, 2007, Enterprise Web 2.0, pp. 1-8.*

* cited by examiner

*Primary Examiner* — Duy Khuong Nguyen
(74) *Attorney, Agent, or Firm* — Hickman Palermo Becker Bingham LLP; Edward A. Becker

(57) ABSTRACT

Techniques are provided for versioning and refactoring of mashups. During the design phase of a mashup that is operable to access multiple external services, design information that defines or modifies a plurality of design elements included in the mashup is received from a user. Without receiving from the user any input that causes the plurality of design elements to be versioned, current versions of the plurality of design elements are automatically stored in a repository when the plurality of design elements are saved during development of the mashup. The mashup is deployed to one or more servers. Without receiving any input from the user that causes the mashup to be versioned, deploying the mashup comprises automatically storing in the repository a current version of the mashup and versioning information that associates the current version of the mashup with the current versions of the plurality of design elements.

24 Claims, 4 Drawing Sheets

VERSIONING AND REFACTORING OF BUSINESS MASHUPS IN ON-DEMAND ENVIRONMENTS

FIELD OF THE INVENTION

This invention relates generally to software development.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Traditional approaches for versioning a software product during the product's design, development, and deployment phases require a software developer to set up a versioning environment. The software developer typically sets up the versioning environment by choosing which modules, data and code files, and other product components to version and by determining a schedule according to which the various components of the software product are to be versioned. As a result of the software developer's choices and to the extent thereto, the versioning environment may be used to determine and track various versions of the software product, including any test versions, beta versions, and release versions.

In a typical example, a team of software developers would use an Integrated Development Environment (IDE) system to develop a software product, and the IDE system would provide versioning functionality in the form of a versioning add-on module. To set up versioning for the software product, a software developer (typically a team leader or a project manager) would enter in the versioning add-on module all information that is necessary to define when, how, and what components of the software product would be versioned. As a result, the team of software developers would be able to track various versions of their software product during the design, development, testing, and release phases of the product's life-cycle.

The traditional approaches for versioning of software products, however, do not work well when used in conjunction with two recent trends in computing—mashups and On-Demand delivery of software. In general, a mashup is a composite application that is operable to integrate and present data provided by multiple external sources such as, for example, web services. On-Demand delivery of software (also known as Software as a Service, or SaaS) refers to a software delivery model where software vendors provide software capabilities on a subscription basis through software services, which are hosted by the vendors and which can be accessed by various subscribers when needed. For example, SaaS applications may be delivered to subscribers through web browsers, thus allowing the software vendors to host the underlying services and to benefit from the economies of scale. The SaaS model provides a good environment for the delivery and use of various types of mashups because mashups typically interact with external services, many of which can be provided on-demand.

One disadvantage of using the traditional versioning approaches for mashups is that these traditional approaches require access to the entire software product being developed in order to ensure consistency and integrity between the various components and versions of the product. However mashups, especially mashups deployed in a SaaS model, rely extensively on external services over which the mashup developers have no control. Thus, a mashup developer would not be able to set up a stable versioning environment for her mashup because the developer would simply lack the knowledge necessary to reflect any versioning dependencies dictated by the external services. For example, since changes in even one external service accessed by the mashup are likely cause the mashup to break, and since the mashup developer has no knowledge of or control over these changes, any prior versions of the mashup are likely to be useless.

Another disadvantage of using the traditional versioning approaches for mashups in SaaS models is that the traditional versioning approaches typically require very complicated setups, which can only be accomplished by sophisticated users such as software developers. However, mashups can be fairly easily designed and developed by unsophisticated software users such as business users. The reason for this is that many software vendors provide user-friendly and easy-to-use development tools that expose SaaS and other web services, and allow the rapid development of mashups that integrate and present various data from these services. Thus, a business user using such a development tool may be able to easily and rapidly develop a mashup, but will not be able to version the mashup because setting up a versioning environment would require technical knowledge which the business user is unlikely to have.

The disadvantages of the traditional versioning approaches described herein are not unique to any particular types of mashups or to any particular types of services. Rather, similar disadvantages are encountered for various types of mashups, such as data mashups, presentation mashups, and business mashups, and for various types of services, such as web services and enterprise intranet services.

BRIEF DESCRIPTION OF THE DRAWINGS

In the figures of the accompanying drawings like reference numerals refer to similar elements.

DETAILED DESCRIPTION

Figure 1:
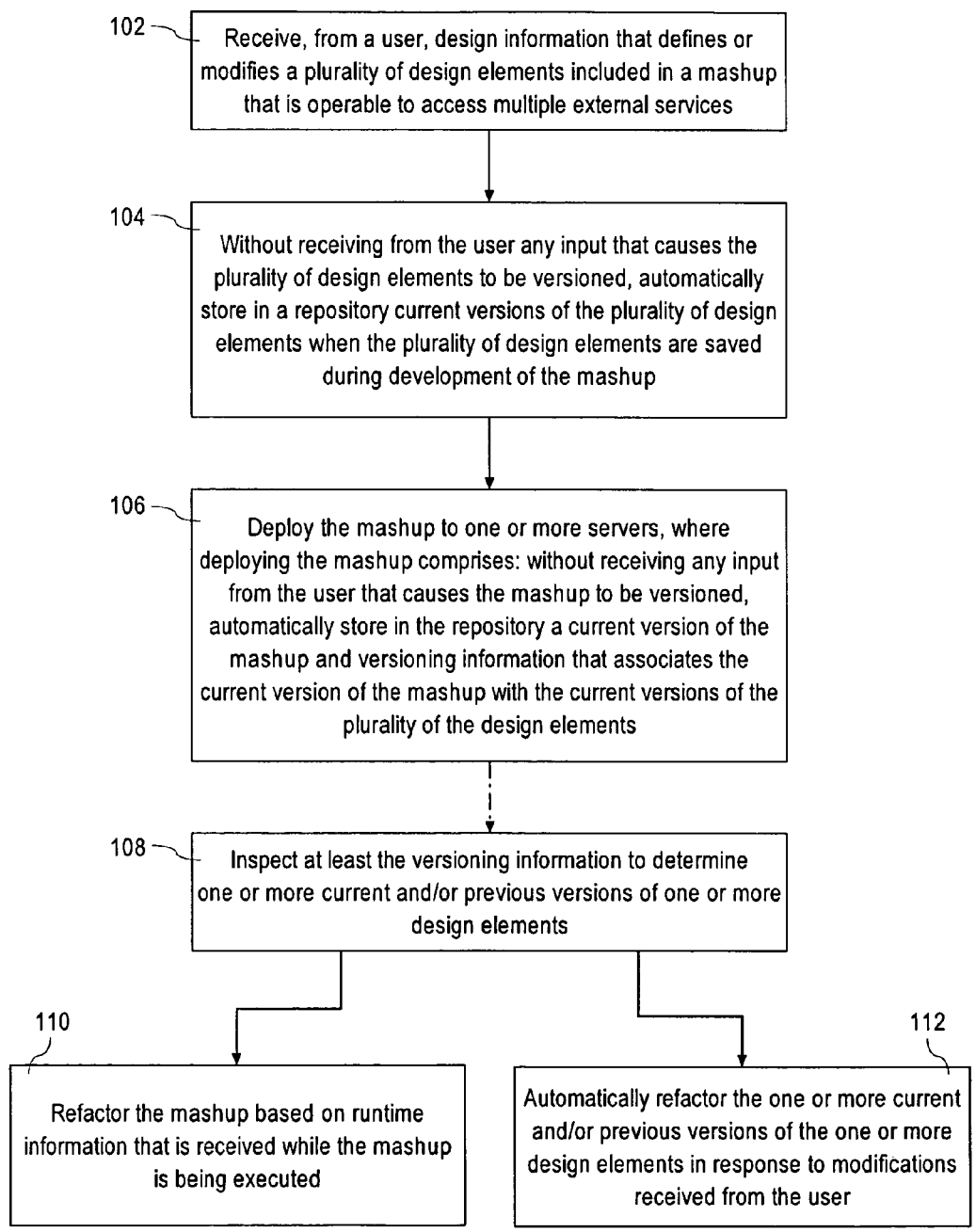
FIG. 1 is a flow diagram that illustrates a method for versioning and refactoring of mashups according to an example embodiment.

In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention. Various aspects of the invention are described hereinafter in the following sections:

I. OVERVIEW
II. FUNCTIONAL DESCRIPTION OF AN EXAMPLE EMBODIMENT
III. EXAMPLE OPERATIONAL CONTEXT
IV. VERSIONING OF MASHUPS AND MASHUP DESIGN ELEMENTS
V. REFACTORING OF MASHUPS
VI. IMPLEMENTATION MECHANISMS

I. Overview

Techniques are described herein for versioning and refactoring of mashups. The techniques described herein provide for the automatic versioning of the design elements that are included in a mashup when the design elements are saved into a repository (e.g., via a check-in operation) by a user during the development of the mashup, and for automatic versioning of the entire mashup when the mashup is deployed to one or more servers in a system that is operable to execute the mashup for the benefit of end users. According to the techniques described herein, the automatic versioning of the entire mashup comprises storing versioning information that associates the current version of the mashup that is being deployed with the current versions of the design elements that are included in and comprise the mashup. In this manner, the techniques described herein allow for the automatic storage, historic maintenance, traceability, and tracking of multiple versions and multiple sets of versioning information for any number of mashup versions and the design element versions included therein. According to the techniques described herein, the stored current and historic versioning information can be used for refactoring of individual design elements as well as refactoring the entire mashup when various user-defined modifications are made and/or when external services modifications are detected.

As used herein, "mashup" refers to a composite software application that is operable to integrate and present functionalities and data that are provided by multiple external services. There are several types of mashups that include, without limitation, presentation mashups, data mashups, and business mashups. A presentation mashup is operable to integrate data from multiple external sources, such as web services, and to present the integrated data to a user in a graphical user interface. An example of a presentation mashup is a mashup that is operable to combine real estate listings provided by a listing service with the corresponding map locations provided by a map service. A data mashup is typically operable to combine and integrate data of similar types that are provided by multiple different services. An example of a data mashup is a mashup that is operable to combine the data from multiple RSS feeds into a single feed. A business mashup is operable to combine and present data from multiple external services and to integrate the data into a business process workflow. As used herein, "process workflow" refers to a sequence of operations that may be performed automatically and/or in response to input provided by one or more end users. An example of a business mashup is a mashup operable to integrate product prices received from one or more web services with a graphical user interface that allows a business manager to approve or reject a discount off the prices for certain products.

As used herein, "version" refers to the combination of a revised copy of a software entity and metadata information that uniquely identifies that revised copy of the software entity. For example, the software entity may be a file and the associated metadata information may be a number that identifies a particular revision of that file. In another example, the software entity may be a data object and the associated metadata information may be a label that identifies a particular revised instance of the data object. In yet another example, the software entity may be a software product and the associated metadata information may be a number that identifies a particular release or revision of the product. It is noted, however, that the techniques described herein are not limited to versions that comprise any particular type of software entity or any particular type of metadata information; thus, the version examples provided herein are to be regarded in an illustrative rather than a restrictive sense.

In some implementations, the software entity and the metadata information that comprise a particular version may be stored together in the same storage location. For example, metadata information identifying a particular revised copy of an executable file may be stored within that copy of the executable file. In other implementations, the software entity and the metadata information that comprise a particular version may be stored in separate storage locations. For example, metadata information identifying a particular revised copy of a source code file may be stored within a database managed by a configuration management system while the revised copy of the source code file itself may be stored in a file system at a location that is configured to store the files for a specific software project. It is noted, however, that the techniques described herein are not limited to any particular mechanism for storing versions of software entities, and for this reason the examples of storing versions provided herein are to be regarded in an illustrative rather than a restrictive sense.

Techniques for versioning and refactoring of mashups described herein allow technologically unsophisticated software users, such as business users, to fully avail themselves of the benefits afforded by the versioning of the mashups that these software users design, develop, and deploy. In contrast to traditional versioning approaches that require extensive technical knowledge to set up and use a versioning environment, the techniques described herein provide for automatic versioning of mashups and the design elements thereof. The automatic versioning of mashups provides versioning information that can be used to provide the software users with various benefits, such as traceability to mashup designs and mashup refactoring, that allow users to rapidly design, develop, and deploy various types of mashups. In addition, the versioning information provided by the automatic versioning of mashups allows a mashup to be deployed in a SaaS model while still providing a full range of versioning throughout the mashup's design, development, deployment, and use life-cycle phases.

II. Functional Description of an Example Embodiment

FIG. 1 is a flow diagram that illustrates a method for versioning and refactoring of mashups according to an example embodiment.

In step 102, design information is received from a user. The design information defines, or specifies modifications to, a plurality of design elements that are included in a mashup that is operable to access multiple external services. The design information received from the user may be in any suitable format and may specify an initial definition of, or a subsequent modification to, any one or all of the design elements included in the mashup.

As used herein, "design element" refers to a software element that is defined and used in a mashup. Examples of design elements include, but are not limited to: contracts that define the input/output parameters of external services, such as Web Services Description Language (WSDL) definitions for web services; graphical user interfaces (GUIs) and GUI elements (such as buttons, drop-down boxes, text boxes, list boxes, etc.) that are operable to receive input from end users when the mashup is executed; forms that are operable to receive user input or to display information to end users;

scripts in various scripting languages that are operable to provide a particular functionality when the mashup is executed; JavaScript code, VB script code, and any other code, which may be user-provided or automatically generated and which may be executed on various virtual machines in runtime execution environments; executable instructions defined in a markup language, such as XML or HTML; sets of source code instructions that may be compiled prior to deploying the mashup for execution; instructions in extensible transformation languages, such as XSLT or CSS templates; and event definitions that define events that are included in, and integrate, process workflows, such as human workflows and system workflows included in the mashup. The techniques described herein are not limited to any particular types of design elements; rather, the techniques described herein can be used to automatically version any type of software element that can be included in a mashup during the design and development of the mashup. Thus, the examples of mashup design elements provided herein are to be regarded in an illustrative rather than a restrictive sense.

In step 104, the design elements included in a mashup are automatically versioned when the design elements are saved in a repository (e.g., via a check-in operation) during the design and/or development phase of the mashup. The automatic versioning of the design elements is performed without receiving from the user any input that causes the design elements to be versioned. The automatic versioning of the design elements comprises automatically storing, in one or more repositories, current versions of the design elements included in a mashup. For example, suppose that a user who is developing a mashup provides input that causes a particular design element or elements to be saved and checked-in into a configuration management system (e.g., when the user clicks a "SAVE" or "CHECK-IN" button in a software program for designing mashups). In response to the user input, according to the techniques described herein current versions of the particular design element or elements are automatically stored in a repository.

In step 106, the mashup is deployed to one or more servers that are operable to execute the mashup for one or more end users. According to the techniques described herein, as part of deploying the mashup the entire mashup is automatically versioned. Without receiving any input from the user that causes the mashup to be versioned, a current version of the mashup and versioning information that associates the current version of the mashup with current versions of the design elements included in the mashup are automatically stored in one or more repositories when the mashup is deployed to one or more servers. For example, suppose that a user provides input to a deployment software program which instructs the program to deploy a mashup to one or more servers for execution. (An example of this would be a user clicking on a "DEPLOY" button in a mashup design/deployment software tool.) In response to the user input, a current version of the mashup and versioning information that associates the current version of the mashup with the current versions of the design elements included in the mashup are automatically stored in a repository.

In this manner, the techniques described herein provide for storing and maintaining versioning information that associates a particular mashup version with the particular versions of design elements that are included in the particular mashup version. Storing versioning information in accordance with the techniques described herein ensures that a set of versioning information is going to be available for any previous and current versions of the mashup and that any given set of versioning information would identify the correct version of the mashup and the correct versions of the design elements included in that particular version of the mashup. The versioning information may be stored in any suitable form or format that allows for automatic and/or manual querying, inspection, and retrieval of data that identifies a particular version of the mashup and the particular versions of the design elements included in that particular version of the mashup.

After the mashup is deployed to the one or more servers for execution, in step 108 the versioning information may be inspected to determine one or more current and/or previous versions of design elements that are included in a current and/or previous version of the mashup that is of interest to users. For example, based on certain parameters and/or conditions, a query may be automatically issued against a repository that stores sets of versioning information for multiple (current and/or previous) versions of multiple mashups. The query may be used to find and retrieve versions of, and versioning information for, a particular mashup and/or design elements thereof that satisfy the parameters and conditions specified in the query.

For example, in step 110 the mashup may be refactored based on versioning information for the mashup and on runtime information that is received while the mashup is being executed. As used herein, "refactoring" refers to modifying any part or portion of a mashup, including any parts or portions of design elements included in the mashup. Refactoring may be automatic or may be made in response to user input. In various implementations, refactoring may include making modifications to any software element that is included in a mashup including, but not limited to, a design element, a definition (such as a service contract, an event definition, or a design element definition), a specification of a design element or of the entire mashup (such as a deployment specification), and a mashup or design element parameter (such as a field name or field data type).

As used herein, "runtime" information refers to any information that is obtained while a mashup is being executed. Runtime information may include, but is not limited to, error messages received from one or more services when the mashup tries to access these services, various notifications and other non-critical information that may be sent from various services to the mashup and/or to the one or more servers that execute the mashup, and various other information that may be retrieved by the mashup and/or by the one or more servers while the mashup is being executed. Such runtime information may be automatically inspected and compared to versioning information to identify one or more versions of design elements that may be affected. The runtime information may then be used to automatically refactor the identified one or more versions of the design elements, or may be sent in a notification to a user who may subsequently make modifications to the one or more design elements accordingly.

Similarly, in step 112 the mashup may be refactored based on modifications received from a user and on versioning information for one or more current and/or previous versions of one or more design elements included in a given mashup. For example, suppose that a user renames a particular field specified in a WSDL contract for a web service that is used by multiple mashups. After the user saves or checks in a repository the modified WSDL contract, the repository storing the versioning information for the multiple mashups may be automatically queried to determine all current or previous versions of all mashups and design elements thereof that are affected by the renaming of the particular field. Thereafter, all identified mashup versions and design element versions may be automatically changed to reflect the new name of the particular field. Alternatively, or in addition to, the user may be notified of all the identified mashup versions and design element versions so that the user can make the necessary modifications thereto.

In this manner, the techniques for versioning and refactoring of mashups described herein allow technologically unsophisticated software users to design, develop, deploy, and maintain mashups while at the same time fully availing themselves of the benefits afforded by versioning of the mashups and of the design elements thereof.

III. Example Operational Context

Figure 2A:
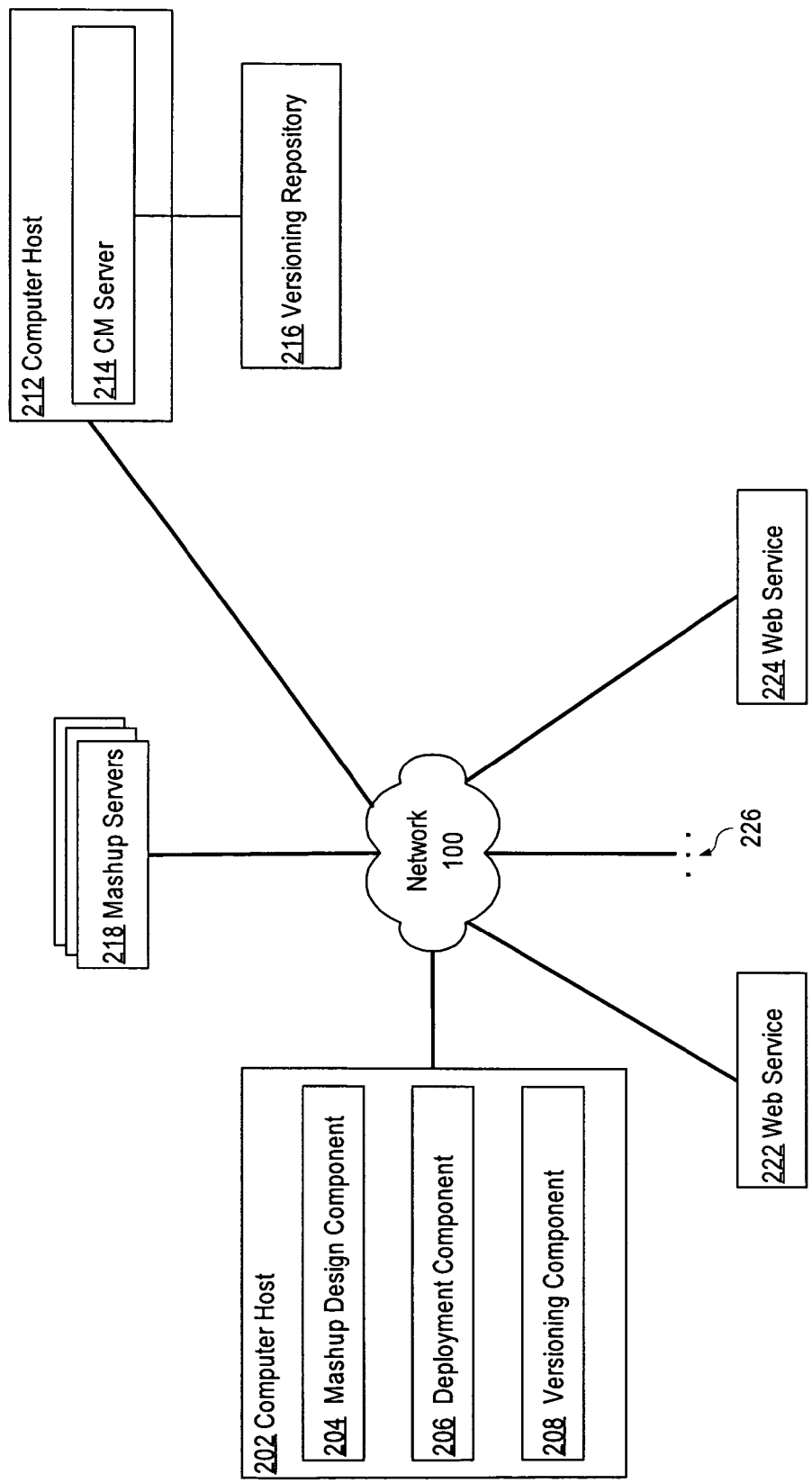
FIG. 2A is a block diagram that illustrates an operational context according to an example embodiment.

FIG. 2A is a block diagram that illustrates an operational context according to an example embodiment.

Figure 3:
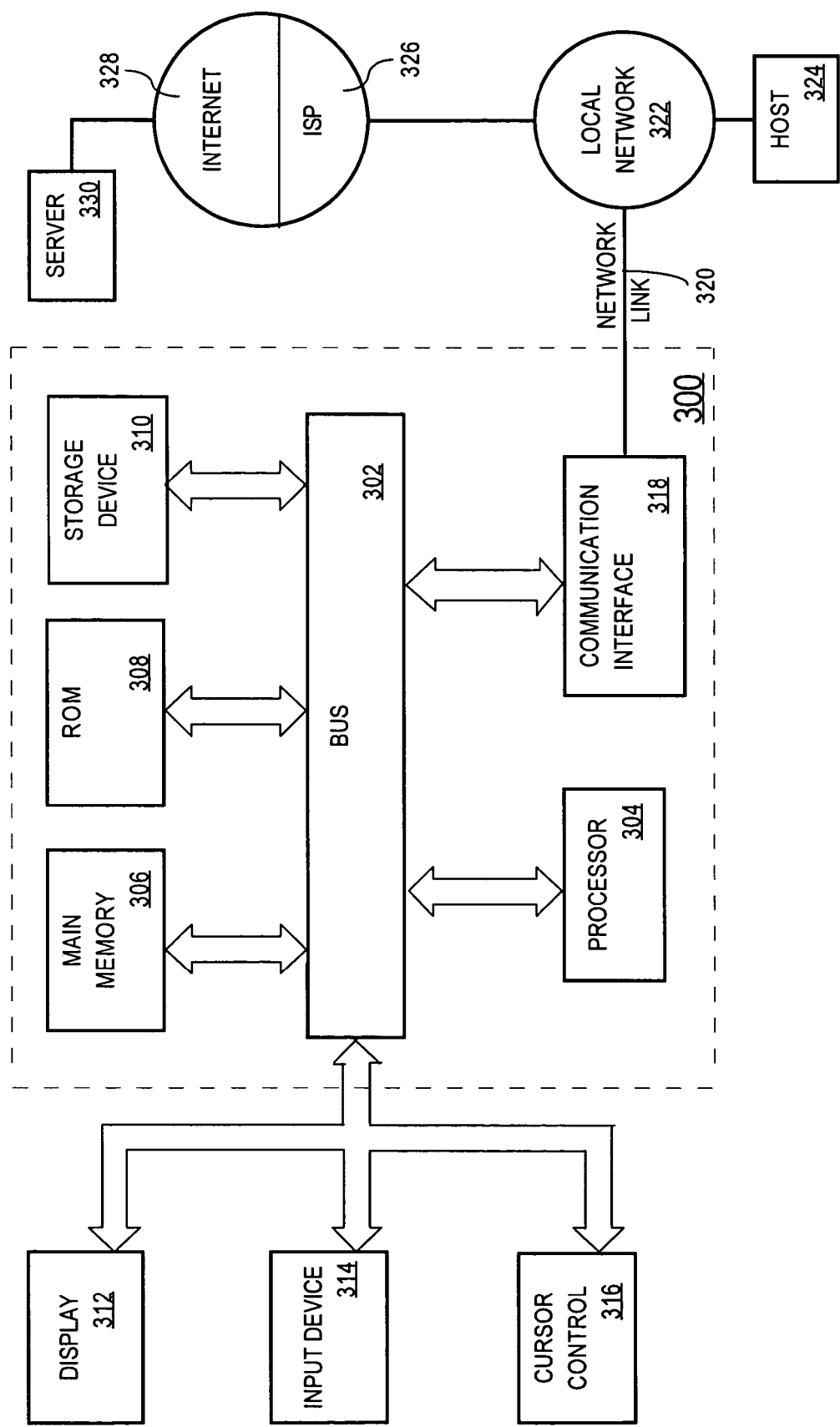
FIG. 3 is a block diagram that illustrates an example computer system on which embodiments may be implemented.

Computer hosts 202 and 212 are communicatively connected over network 100 to mashups severs 218. Computer hosts 202 and 212 may be computer systems operable to execute program code that implements the techniques for versioning and refactoring of mashups described herein. A block diagram of an example computer system is illustrated in FIG. 3 and is described hereinafter.

Referring to FIG. 2A, computer host 202 is operable to execute mashup design component 204, deployment component 206, and versioning component 208. In one example embodiment, mashup design component 204, deployment component 206, and versioning component 208 may all be included in a software program that is operable to enable a user to design and deploy mashups. Other embodiments may use different form factors to provide software and/or hardware modules that implement a mashup design component, a deployment component, and a versioning component in accordance with the techniques described herein. For example, in some embodiments a single software module may provide the functionalities of a mashup design component, a deployment component, and a versioning component. In other embodiments, a mashup design component, a deployment component, and a versioning component may be provided as separate standalone programs, as separate add-on modules to a single software program, or as add-on modules to one or more clients in a client-server application. Thus, the techniques described herein are not limited to any particular implementation of the functionalities of the mashup design component, the deployment component, and the versioning component that are described hereinafter.

Mashup design component 204 may be implemented as a set of instructions which, when executed by one or more processors, are operable to allow a user to design a mashup. For example, mashup design component 204 may be operable to provide the GUI interfaces and other forms, as well as the underlying logic, through which the user may provide design information that defines or modifies a mashup and the design elements included therein. The GUI interfaces and forms, as well as the underlying logic, may comprise a visual design tool that allows the user to drag-and-drop various design elements into a work area, and to interconnect the various design elements by visually designing an orchestration that combines and integrates the design elements into a process workflow. Mashup design component 204 also provides the user with the ability to check-in and save the individual design elements, as well as the entire mashup, into a configuration management system such as configuration management (CM) server 214 that is provided on computer host 212. For example, mashup design component 204 may be implemented in a client that is operable to communicate with CM server 214 over a configuration management protocol.

Mashup design component 204 may be communicatively connected or operatively coupled to deployment component 206 and to versioning component 208. In addition, mashup design component 204 may provide logic that is operable to perform mashup refactoring in accordance with the techniques described herein.

Deployment component 206 may be implemented as a set of instructions which, when executed by one or more processors, are operable to deploy a mashup to a mashup execution environment, such as the environment provided by mashup servers 218. Deploying a particular mashup to a mashup execution environment may include, without limitation, compiling any mashup code that needs to be compiled, generating a package that includes one or more scripts, forms, interfaces, and files that implement the various design elements of the particular mashup, and installing the package on the various servers and other platforms provided in the mashup execution environment. The mashup execution environment may comprise one or more mashup servers 218 that are operable to execute and otherwise integrate the various elements included in a mashup. Examples of such mashup servers include, without limitation, web servers, application servers such as servers that execute virtual machines, database servers, print servers, fax servers, and any other software servers and services that are operable to execute various mashup elements. Some embodiments may provide one or more mashup servers that execute a runtime engine that is operable to initialize and coordinate the execution of a mashup on a number of other mashup servers.

When a mashup is executed in the mashup execution environment that comprises mashup servers 218, the mashup may access through network 100 one or more external services such as web services 222 and 224. As used herein, "external service" refers to a remote service that is provided separate and independent of a mashup that accesses the service. In some operating environments, an external service may be a service that is provided by a third-party and is configured behind a firewall and/or in a different domain than the mashup servers that execute a mashup. In some operating environments, an external service may be provided on an enterprise intranet. The techniques described herein are not limited to mashups that access any particular types of external services. Rather, the techniques for versioning and refactoring of mashups described herein may be implemented for mashups that are deployed in a SaaS model that allows access to any type of external services. Further, the techniques described herein are not limited to mashups that access any particular number of external services; rather, the techniques described herein allow for mashups that access any number of services, as indicated by ellipses 226.

Versioning component 208 may be implemented as a set of instructions which, when executed by one or more processors, are operable to automatically version design elements and entire mashups in accordance with the techniques described herein. For example, versioning component 208 may be implemented in a client that is operable to communicate with CM server 214 over a configuration management protocol.

Versioning component 208 may be communicatively connected and/or operatively coupled to mashup design component 204 and deployment component 206. For example, when a user provides input to mashup design component 204 that specifies that a design element is to be saved and/or checked-in, mashup design component 204 may make a call to (or may otherwise notify) versioning component 208. In response, versioning component 208 may automatically determine and store the current version of the design element that is being saved and/or checked-in. Similarly, when a user provides input to deployment component 208 that specifies that a mashup is to be deployed, deployment component 206 may make a call to (or may otherwise notify) versioning component 208. In response, versioning component 208 may automatically determine and store a current version the mashup and versioning information that associates the current version of the mashup being deployed with the current versions of the design elements included in the mashup.

Computer host 212 is operable to execute CM server 214 and to provide CM server 214 with communicative and/or operative access to versioning repository 216. CM server 214 is operable to control and manage mashup development (and possibly development of other types of software products) by supporting various development functionalities including, without limitation, checking-in and saving of mashup elements, configuring and managing deployment packages, managing developer access to mashup files, authenticating and logging developers in and out, maintaining developers' profiles, and managing shared developer access to mashups and/or design elements thereof. Repository 216 may comprise one or more databases for storing version metadata information that is included in mashup versions and in design element versions. Repository 216 may also comprise one or more file systems (local and/or remote) that are operable to store revised copies of the mashup deployment packages, and revised copies of the mashup design elements that are included in the mashup versions and in the design element versions.

Figure 2B:
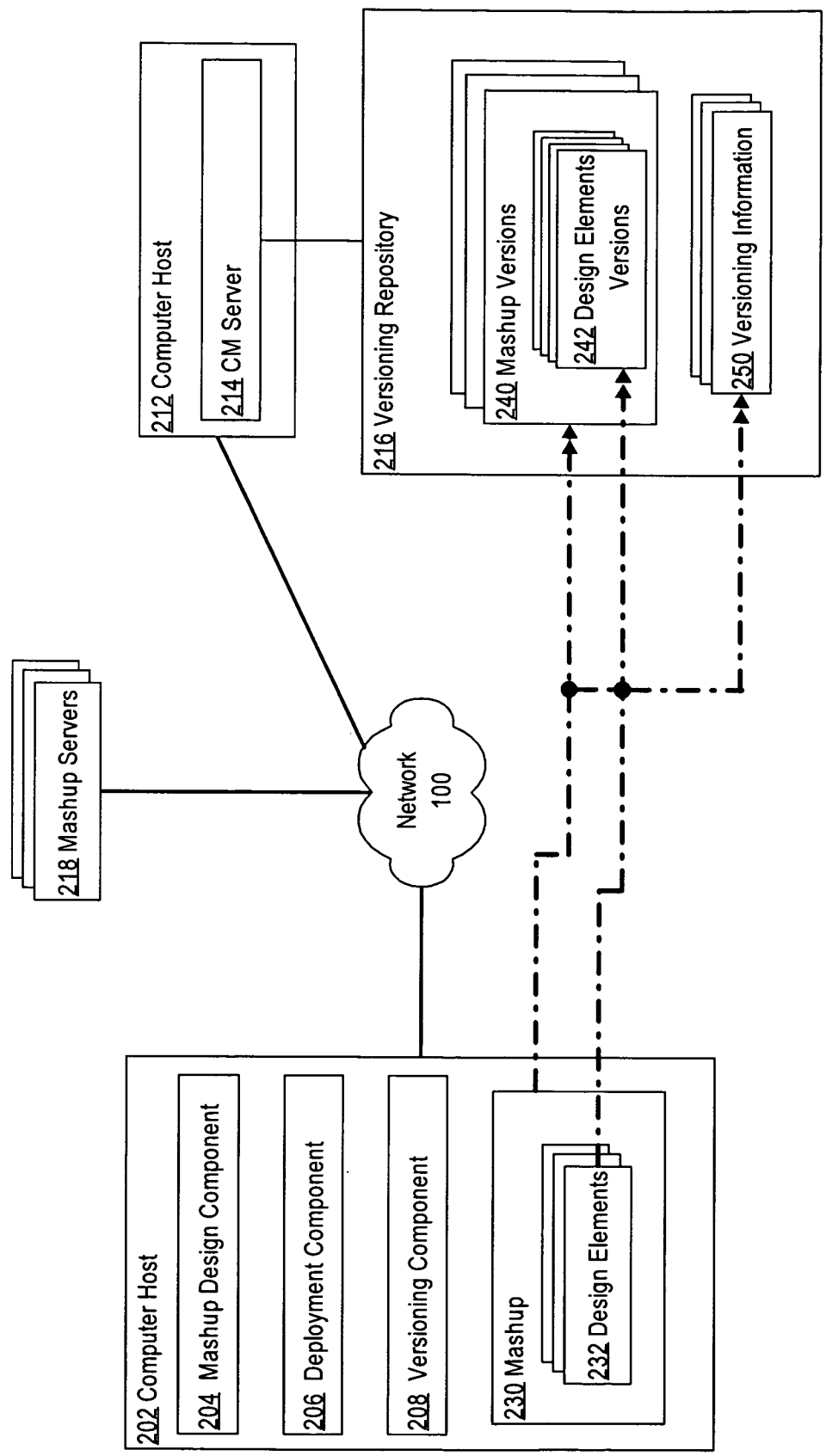
FIG. 2B is a block diagram that illustrates mashup versioning according to an example embodiment.

FIG. 2B is a block diagram that illustrates an operational example of mashup versioning according to an example embodiment. As illustrated in FIG. 2B, suppose that a user (not shown) of computer host 202 uses mashup design component 204 to design mashup 230.

For example, the user may provide into mashup design component 204 design information that defines or modifies design elements that are included in mashup 230. When the user provides input that specifies that one or more of design elements 232 are to be saved and checked-in in a repository, mashup design component 204 calls (or otherwise notifies) versioning component 208. It is noted that neither the user input specifying that the one or more design elements are to be saved or checked-in, nor any other input that may have been previously provided by a user, specifies or otherwise causes the one or more design elements to be versioned. This in contrast to prior approaches for versioning of software products, in which a user needed to explicitly set up a versioning environment and specify what objects are to be versioned and when. In response to the user input that specifies that one or more of design elements 232 are to be saved and/or checked-in, versioning component 208 automatically determines and stores the current version of each design element through CM server 214 into repository 216. The current version of each design element comprises versioning metadata information that identifies the currently revised copy of that design element.

It is noted that the user may modify design elements 232 multiple times before mashup 230 is developed into its final form. According to the techniques described herein, each time the user modifies and saves a particular design element into a repository (e.g. repository 216) via a check-in operation, versioning component 208 automatically determines and stores in repository 216 a separate version of that particular design element that reflects the current modification. Thus, multiple previous versions may be automatically stored for any design element included in mashup 230. This allows the techniques described herein to provide full traceability of the design elements during the development of mashup 230.

When the user finalizes mashup 230, the user provides input into mashup design component 204 (or directly into deployment component 206) that indicates that mashup 230 is to be deployed into the mashup execution environment that includes mashup servers 218. In response to the user input, deployment component 206 generates a package with the executables of mashup 230 and deploys the package to mashup servers 218. In addition, deployment component 206 calls (or otherwise notifies) versioning component 208 that mashup 230 is deployed. In response, versioning component 208 automatically versions mashup 230 through CM server 214 into repository 216. It is noted that neither the user input specifying that mashup 230 is to be deployed, nor any other input that may have been previously provided by a user, specifies or otherwise causes mashup 230 to be versioned. This in contrast to prior approaches for versioning of software products, in which a user needed to explicitly set up a versioning environment and specify how and when a mashup is to be versioned.

To version mashup 230 in response to the deployment of the mashup, versioning component 208 automatically determines and stores the current version of mashup 230 into repository 216. The current version 240 of mashup 230 comprises the currently deployed package of mashup 230 and versioning metadata information that identifies the currently deployed package. In addition, versioning component 208 automatically determines and stores in repository 216 versioning information 250. Versioning information 250 associates the current version 240 of mashup 230 with the current versions 242 of design elements 232 that are included in the current version 240. In various implementations, versioning information 250 may be stored in a variety of formats. In one example implementation, versioning repository 216 may use a relational database to store versioning metadata information. In this implementation, versioning information 250 may comprise one or more records in relational tables that are associated through a parent-child relationship. A record in a parent table would store data that identifies the mashup version 240, and one or more records in one or more child tables would store data that identifies each of the design element versions 242. In another example implementation, versioning repository 216 may use an object-relational database to store versioning metadata. In this implementation, version information 250 may comprise a data object instance that includes an attribute identifying the mashup version 240 and one or more attributes that identify each of design element versions 242. Other implementations may provide other suitable formats and mechanisms for storing versioning information 250.

It is noted that the user may modify and deploy mashup 230 multiple times. According to the techniques described herein, each time the user modifies and deploys mashup 230, versioning component 208 automatically determines and stores in repository 216 a separate version 240 of the mashup and a separate set of versioning information 250. Each separate version 240 and the corresponding set of versioning information 250 reflect and identify those versions 242 of the design elements which versions are included in that particular version 240 of the mashup. In this manner, the techniques described herein provide for storing previous mashup versions along with previous versioning information, where a particular set of previous versioning information is always going to identify a particular previous mashup version and the correct previous versions of the design elements included in that particular mashup version. This allows the techniques described herein to provide full traceability and historical deployment record of mashup 230 and of the design elements included therein.

It is noted that FIG. 2B depicts an operational scenario in one example operational context. However, the techniques described herein are not limited to the particular operational scenario depicted in FIG. 2B or to the particular operational context depicted in FIG. 2A. For this reason, the operational context and the operational scenario depicted in FIGS. 2A and 2B are to be regarded in an illustrative rather than a restrictive sense.

IV. Versioning of Mashups and Mashup Design Elements

According to the techniques described herein for versioning and refactoring of mashups, the design elements included in a mashup are automatically versioned when the design elements are saved in a repository (e.g., via a check-in operation) by a user during the development of the mashup, and the entire mashup is automatically versioned when the mashup is deployed to one or more servers for execution to the benefit of end users. According to the techniques described herein, the automatic versioning of the entire mashup comprises storing versioning information that associates the current version of the mashup that is being deployed with the current versions of the design elements that are included in and comprise the mashup. The techniques described herein provide for automatic versioning of mashups and of the design elements therein without receiving any input from a user that causes the mashup or the design elements to be versioned. In this manner, the techniques described herein allow technologically unsophisticated software users (such as business users) to design, develop, deploy, and maintain mashups while at the same time fully availing themselves of the benefits afforded by versioning of the mashups and of the design elements therein.

Versioning of Mashup Design Elements

In some embodiments, a design element included in a mashup may be automatically versioned by storing in a repository at least the following: a currently revised copy (or a new copy, when the design element is initially introduced in the mashup) of the design element; and version metadata information that identifies the revised copy of the design element. The currently revised copy of the design element includes any current modifications that are made, saved, and checked-in by a user. The version metadata information may be any data that is capable of uniquely identifying a revised copy of the design element. According to the techniques described herein, the version metadata information may be automatically determined and/or assigned when the user provides input indicating that the design element is to be saved or checked-in.

For example, the design element may be a script file that is included in a mashup, and the version metadata information may be version number that is automatically determined and assigned to the script file. In response to the user storing a modified revision of the script file, a copy of the revised file may be stored in a file system. Further, the version number identifying that copy of the script file may be automatically determined and stored in a repository, such as a database configured to store versioning information. Along with the version number, information about the location of the copy of the script file (e.g., a file name and a file system path) may also be stored in the repository. In another example, the design element may be a GUI form that is included in the mashup, and the version metadata information may be a unique label that is automatically determined and associated with the GUI form. In response to the user modifying and storing the GUI form, a copy of the modified GUI form may be stored as a file in a file system, where the file also includes the unique label that identifies that copy of the modified GUI form. In addition, or instead of, the unique label along with information about the location of the GUI form file in the file system may be also automatically stored in a repository configured to store versioning information.

It is noted that the techniques described herein are not limited to any particular types of design elements that can be automatically versioned or to any particular mechanism of versioning. Rather, the techniques described herein can be used to automatically version, by using any suitable versioning mechanism, any type of software element that can be included in a mashup during the design and development of the mashup.

Versioning of WSDL Contracts

In some embodiments, the WSDL contracts of external web services accessed by a mashup may be included in the mashup as design elements during the development phase of the mashup. In these embodiments, the WSDL contracts may be automatically versioned according to the techniques described herein like any other mashup design element.

As used herein, "contract" refers to a set of information that describes a service. The contract of a service may specify zero or more input interfaces and/or zero or more output interfaces of the service. For example, the contract for a specific service may define only one or more input interfaces of the service but no output interfaces, and vice versa. In another example, the contract for a specific service may define an "empty set" input interface. In yet another example, the contract of a specific service may not define an input interface at all. In some embodiments, a contract may comprise a Web Services Description Language (WSDL) definition that includes elements and attributes defined in an eXtensible Markup Language (XML) format, where the elements and attributes of the WSDL definition may describe a particular web service that is deployed in accordance with a SaaS model.

In some embodiments, the WSDL definition included in a service contract may conform (fully or partially) to a WSDL specification that is published by the W3C consortium. An example of such WSDL specification is the Web Services Description Language (WSDL) 1.1 Specification, which was published as a W3C Note on 15 Mar. 2001 at "http://www.w3.org/TR/wsdl". A WSDL definition may include attributes and elements that are defined in an XML format. A WSDL definition may describe a web service as a set of one or more service ports. A service port is a network endpoint that comprises a combination of a network address and a binding, where the binding specifies a network communication protocol and a message format that is associated with a particular service port type. The message format is a description of data that may be sent to and from a service, and a service port type refers to a collection of operations that are defined for and may be performed by the service. A WSDL definition may include separate bindings that represent and define the input interface and the output interface of the web service.

According to the techniques described herein, a web service contract including a WSDL definition may be provided as a design element within a mashup and exposed to the user during the design and development phase of the mashup.

Regardless of, or in addition to, any version information that may be included in the web service contract or in the WSDL definition itself, the techniques described herein provide for automatically storing a version of the contract when the user saves one or more design elements that refer to or otherwise use the contract in the mashup. The version of the contract may include a copy of the contract (and the WSDL definition included therein) as it currently exists when the version is stored, and a version number that is automatically determined and assigned to the contract. In response to the user storing the one or more design elements that refer to or otherwise use the contract, a copy of the contract may be stored as a file in a file system. Further, the version number identifying that copy of the contract file may be automatically determined and stored in a repository, such as a database configured to store versioning information. Along with the version number, information about the location of the copy of the contract file (e.g., a file name and a file system path) may also be stored in the repository. In this manner, the techniques described herein provide for automatic versioning of web services contracts that include WSDL definitions.

The automatic versioning of web services contracts in accordance with the techniques described herein allows for traceability of any changes that are introduced into the web services. Since any interactions with a web service are performed based on the service contract, automatically storing any previous and current versions of the contract allows the users designing mashups to see and consider any contract changes and to refactor the current and/or any previous versions of the mashups that access that service in order to improve the overall performance of the mashups.

Further, the automatic versioning of web services contracts in accordance with the techniques described herein allows dependencies between mashup elements and different instantiations/installations of the web services to be tracked clearly and to be traced back across different mashup versions. For example, based on version metadata information included in a particular version of a web service contract, one or more design elements that access the web service may be automatically determined when a change in the web service contract (e.g., a change in the WSDL definition included therein) is detected. A notification may then be send to the user that identifies the one or more design elements and that indicates that the one or more design element may need to be changed because the web service contract (and/or the WSDL definition therein) have been changed by the party that provides the web service. In this manner, the techniques described herein allow mashups to be refactored based on changes in the external services that they access, which in turn allows the users to reliably design mashups that access SaaS services over which the users have no control.

Versioning of Business Mashups and Business Mashup Elements

In some embodiments, the techniques for versioning of mashups described herein may be used to automatically version business mashups and the design elements included therein.

A business mashup is a composite application operable to combine and present data from multiple external services and to integrate the data into a business process workflow which, when executed, provides one or more results or outputs that have business meaning or significance. The business process workflow may include: a human workflow, which may include one or more operations that are performed in response to input provided by one or more users; a system workflow, which may include operations that are automatically performed without requiring any interactive user input; and any design elements, such as event definitions, that bind, coordinate, or otherwise integrate the workflow operations.

A business mashup, and any process workflow elements and other design elements included in the business mashup, may be automatically versioned according to the techniques described herein like any other type of mashup. For example, in response to the user modifying and storing a particular design element of the business mashup, a copy of the modified design element may be stored as a file in a file system or as any other type of data object in a suitable data repository. The modified design element may be any element of the business mashup including, but not limited to, a human workflow element (e.g., a GUI form), a system workflow element (e.g., a script file), and a process coordination element (e.g., an event element that is operable to trigger a particular event during the execution of the process workflows). Along with storing the copy of the modified design element, a version number identifying that copy of the design element may be automatically determined and stored in a repository, such as a database configured to store versioning information. Along with the version number, information about the location of the copy of the design element (e.g., a file name and a file system path for design elements that are stored as files or an object ID for design elements that are stored as data objects) may also be stored in the repository.

Versioning of Mashup Packages

The techniques described herein for versioning and refactoring of mashups provide for automatic versioning of an entire mashup when the mashup is deployed to one or more servers in a system that is operable to execute the mashup for the benefit of end users. The automatic versioning of the entire mashup comprises storing versioning information that associates the current version of the mashup that is being deployed with the current versions of the design elements that are included in and comprise the mashup. According to the techniques described herein, the automatic versioning of the mashup is performed without receiving any input from a user that causes the mashup to be versioned.

In some embodiments, the mashup may be deployed to the one or more servers as a package that includes the mashup design elements in their corresponding executable format. For example, a mashup deployment package may include, but is not limited to, the following: XML-formatted files that store the contracts defining the input/output parameters of external services that are accessed by the mashup; files that store GUI forms and other GUI elements that are operable to receive user input and/or to display information to end users of the mashup; files that store scripts in various scripting languages; markup language files that store executable instructions, such as various XML or HTML documents; files that store instructions in extensible transformation languages, such as XSLT or CSS templates; executable or link files that store any functions, modules, routines, and dynamically linked libraries in compiled form; and text files that store event definitions that define events that are included in, and integrate, process workflows included in the mashup.

In response to user input indicating that the mashup is to be deployed to one or more servers for execution, a package with the mashup executables is generated and deployed/installed on the one or more servers. The package and corresponding versioning information are automatically versioned, where the versioning information associates the generated version of the package with the versions of the design elements included in the package.

For example, in response to the deployment of the mashup package, a copy of the mashup package may be stored in a file system or in another type of suitable repository. A version number identifying the package may be automatically determined, assigned to the package, and stored in a repository, such as a database configured to store versioning information. Along with the version number, information about the location(s) of the copy of the mashup package (e.g., the file name(s) and the file system path(s) of the file(s) comprising the package) may also be stored in the repository. In addition, according to the techniques described herein, the versioning information associating the version of the mashup package with the versions of the design elements included in the package is automatically determined and stored in the repository.

In this manner, the techniques described herein provide for storing and maintaining versioning information that associates a particular mashup version with the particular versions of design elements that are included in the particular mashup version. Storing versioning information in accordance with the techniques described herein ensures that a set of versioning information is going to be available for any previous and current versions of the mashup and that any given set of versioning information would identify the correct version of the mashup and the correct versions of the design elements included in that particular version of the mashup. Various embodiments may provide various mechanisms for querying the versioning information in the repository and for retrieving data that identifies a particular version of the mashup and the particular versions of the design elements included in that particular version of the mashup.

V. Refactoring of Mashups

According to the techniques described herein, versioning information stored for current and previous mashup versions may be used for refactoring of individual design elements as well as for refactoring entire mashups when various user-defined modifications are made and/or when external services modifications are detected.

After a mashup is deployed to the one or more servers for execution, versioning information stored for current and previous mashup versions may be inspected to determine one or more current and/or previous versions of design elements that satisfy some user-provided or system-generated criteria. For example, in some embodiments current versioning information for a mashup may be automatically compared to one or more sets of previous versioning information. Based on the results of the comparison, one or more design elements that have been added, modified, or deleted in the current version of the mashup may be determined.

In some embodiments, versioning information stored for current and/or previous mashup versions may be used in conjunction with runtime mashup information for automatic or user-directed refactoring. Runtime mashup information may include, but is not limited to, error messages received from one or more external services, various notifications and other non-critical information that may be sent from various external services to the mashup, and various other information that may be generated or retrieved by the mashup and/or by the one or more servers while the mashup is being executed.

For example, the runtime information obtained while the mashup is being executed may be automatically inspected and compared to versioning information to identify one or more versions of design elements that may have been be affected in some way. A user notification may then be automatically generated, where the user notification identifies the one or more versions of design elements that are affected and optionally includes any relevant data from the runtime information. Based on the user notification, a user responsible for designing the mashup may determine and make any necessary modifications to the one or more versions of design elements that are affected. Alternatively, after determining the one or more versions of design elements that are affected, the one or more versions may be automatically modified. The automatic modifications may include, for example, renaming the one or more design elements or any sub-elements thereof (such as fields, GUI elements, etc.) as well as automatically identifying and modifying any design elements that depend on, and are affected by, the renaming operation.

In some embodiments, versioning information stored for current and/or previous mashup versions may be used in conjunction with runtime mashup information in order to correlate individual design elements with runtime workflow data for a process workflow defined in a mashup. For example, runtime workflow data may be automatically inspected and compared to versioning information, and the results may be presented to a user in a visualization that graphically indicates to the user the types of refactoring that may need to be made. Examples of refactoring that can be visualized for a mashup in this manner include, but are not limited to, the following: renaming design elements with appropriate propagation; creating a new process workflow or modifying an existing process workflow; creating or expanding process sub-workflows; promoting states in a particular process workflow up a workflow hierarchy so that the particular process workflow may be used by additional child process workflows; demoting states of a particular workflow into a child process workflow; and modifying a particular process workflow so that it can be used by another process workflow.

In some embodiments, the techniques described herein provide for mashup refactoring based on modifications that are received from a user and on versioning information for one or more current and/or previous versions of one or more design elements included in a given mashup. For example, suppose that for whatever reason a user renames a particular field specified in a particular design element of the mashup. After the user saves and checks-in in a repository the particular design element with the renamed field, the repository storing the versioning information for the mashup may be automatically queried to determine all current and/or previous versions of design elements in the mashup that are affected by the renaming of the particular field. Thereafter, all identified current and/or previous versions of the design elements may be automatically modified to refer to the new name of the particular field. Alternatively, or in addition to, the user may be notified accordingly so that the user can make the necessary modifications herself and to determine whether any additional modifications to any current and/or previous versions of the mashup would be necessary.

VI. Implementation Mechanisms

The techniques for versioning and refactoring of mashups described herein may be implemented on any kind of computing platform or architecture, and are not limited to any particular context, computing platform, or architecture. For purposes of explanation, FIG. 3 is a block diagram that illustrates an example computer system 300 upon which embodiments of the techniques described herein may be implemented.

Computer system 300 includes a bus 302 or other communication mechanism for communicating information, and a processor 304 coupled with bus 302 for processing information. Computer system 300 also includes a main memory 306, such as a random access memory (RAM) or other dynamic storage device, coupled to bus 302 for storing information and instructions to be executed by processor 304. Main memory 306 also may be used for storing temporary variables or other intermediate information during execution of instructions to be executed by processor 304. Computer system 300 further includes a read only memory (ROM) 308 or other static storage device coupled to bus 302 for storing static information and instructions for processor 304. A storage device 310, such as a magnetic disk or optical disk, is provided and coupled to bus 302 for storing information and instructions.

Computer system 300 may be coupled via bus 302 to a display 312, such as a cathode ray tube (CRT), for displaying information to a computer user. An input device 314, including alphanumeric and other keys, is coupled to bus 302 for communicating information and command selections to processor 304. Another type of user input device is cursor control 316, such as a mouse, a trackball, or cursor direction keys for communicating direction information and command selections to processor 304 and for controlling cursor movement on display 312. This input device typically has two degrees of freedom in two axes, a first axis (e.g., x) and a second axis (e.g., y), that allows the device to specify positions in a plane.

The invention is related to the use of computer system 300 for implementing the techniques described herein for versioning and refactoring of mashups. According to one embodiment, those techniques are performed by computer system 300 in response to processor 304 executing one or more sequences of one or more instructions contained in main memory 306. Such instructions may be read into main memory 306 from another computer-readable medium, such as storage device 310. Execution of the sequences of instructions contained in main memory 306 causes processor 304 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing data that causes a machine to operate in a specific fashion. In an embodiment implemented using computer system 300, various computer-readable media are involved, for example, in providing instructions to processor 304 for execution. Such a medium may take many forms, including but not limited to storage media and transmission media. Storage media includes both non-volatile media and volatile media. Non-volatile media includes, for example, optical or magnetic disks, such as storage device 310. Volatile media includes dynamic memory, such as main memory 306. Transmission media includes coaxial cables, copper wire and fiber optics, including the wires that comprise bus 302. Transmission media can also take the form of acoustic or light waves, such as those generated during radio-wave and infra-red data communications. All such media must be tangible to enable the instructions carried by the media to be detected by a physical mechanism that reads the instructions into a machine such as, for example, a computer system.

Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer-readable media may be involved in carrying one or more sequences of one or more instructions to processor 304 for execution. For example, the instructions may initially be carried on a magnetic disk of a remote computer. The remote computer can load the instructions into its dynamic memory and send the instructions over a telephone line using a modem. A modem local to computer system 300 can receive the data on the telephone line and use an infra-red transmitter to convert the data to an infra-red signal. An infra-red detector can receive the data carried in the infra-red signal and appropriate circuitry can place the data on bus 302. Bus 302 carries the data to main memory 306, from which processor 304 retrieves and executes the instructions. The instructions received by main memory 306 may optionally be stored on storage device 310 either before or after execution by processor 304.

Computer system 300 also includes a communication interface 318 coupled to bus 302. Communication interface 318 provides a two-way data communication coupling to a network link 320 that is connected to a local network 322. For example, communication interface 318 may be an integrated services digital network (ISDN) card or a modem to provide a data communication connection to a corresponding type of telephone line. As another example, communication interface 318 may be a local area network (LAN) card to provide a data communication connection to a compatible LAN. Wireless links may also be implemented. In any such implementation, communication interface 318 sends and receives electrical, electromagnetic or optical signals that carry digital data streams representing various types of information.

Network link 320 typically provides data communication through one or more networks to other data devices. For example, network link 320 may provide a connection through local network 322 to a host computer 324 or to data equipment operated by an Internet Service Provider (ISP) 326. ISP 326 in turn provides data communication services through the worldwide packet data communication network now commonly referred to as the "Internet" 328. Local network 322 and Internet 328 both use electrical, electromagnetic or optical signals that carry digital data streams. The signals through the various networks and the signals on network link 320 and through communication interface 318, which carry the digital data to and from computer system 300, are exemplary forms of carrier waves transporting the information.

Computer system 300 can send messages and receive data, including program code, through the network(s), network link 320 and communication interface 318. In the Internet example, a server 330 might transmit a requested code for an application program through Internet 328, ISP 326, local network 322 and communication interface 318. The received code may be executed by processor 304 as it is received, and/or stored in storage device 310, or other non-volatile storage for later execution. In this manner, computer system 300 may obtain application code in the form of a carrier wave.

In the foregoing specification, embodiments of the invention have been described with reference to numerous specific details that may vary from implementation to implementation. Thus, the sole and exclusive indicator of what is, and is intended by the applicants to be, the invention is the set of claims that issue from this application, in the specific form in which such claims issue, including any subsequent correction. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A computer-implemented method comprising:
receiving, from a user, design information that defines or modifies a plurality of design elements included in a mashup, wherein the mashup is a composite business application that is operable to integrate and present data obtained from multiple external services;
without receiving directly from the user any input that causes the plurality of design elements to be versioned, automatically storing in a repository current versions of the plurality of design elements when the plurality of design elements are saved during development of the mashup;
deploying the mashup to one or more servers;
in response to the mashup being deployed to the one or more servers, without receiving any input from the user that causes the mashup to be versioned:
automatically storing in the repository a current version of the mashup; and
automatically generating and storing in the repository first versioning information that associates the current version of the mashup with the current versions of the plurality of design elements that are included in the mashup;
wherein the multiple external services comprise a web service;
wherein the plurality of design elements include a contract, wherein the contract includes a Web Services Description Language (WSDL) definition that describes the web service;
wherein automatically storing in the repository the current versions of the plurality of design elements comprises automatically storing in the repository a current version of the contract for the web service;
determining that the WSDL definition in the contract for the web service has changed;
in response to determining that the WSDL definition in the contract for the web service has changed and based on the first versioning information, determining one or more design elements, of the plurality of design elements, that need to be changed; and
notifying the user that the one or more design elements need to be changed because the WSDL definition in the contract for the web service has changed.

2. The computer-implemented method as recited in claim 1, wherein:
the plurality of design elements includes:
one or more data elements that are provided by one or more web services of the multiple external services; and
one or more process elements that define a process workflow that integrates the plurality of design elements to provide a result of the composite business application.

3. The computer-implemented method as recited in claim 1, further comprising:
automatically maintaining in the repository at least one previous version of the mashup, one or more previous versions of one or more of the plurality of design elements, and second versioning information that associates the at least one previous version of the mashup with the one or more previous versions of the one or more of the plurality of design elements; and
inspecting the first versioning information and the second versioning information to determine which design elements, of the plurality of design elements, have been added, modified, or deleted in the current version of the mashup.

4. The computer-implemented method as recited in claim 1, wherein automatically storing in the repository the current versions of the plurality of design elements is performed in response to user input that causes the plurality of design elements to be checked-in and saved into a configuration management system.

5. The computer-implemented method as recited in claim 1, further comprising:
while the mashup is being executed at the one or more servers, receiving runtime information associated with the plurality of design elements; and
refactoring the mashup based on the runtime information, wherein refactoring the mashup comprises:
based on the runtime information, inspecting the first versioning information to determine one or more current versions of one or more design elements included in the plurality of design elements.

6. The computer-implemented method as recited in claim 5, wherein refactoring the mashup further comprises:
notifying the user of the runtime information and of the one or more current versions of the one or more design elements; and
receiving, from the user, one or more modifications to the one or more current versions of the one or more design elements.

7. The computer-implemented method as recited in claim 6, wherein receiving the one or more modifications comprises receiving particular design information that defines one or more new design elements, wherein the one or more new design elements are operable to perform one or more of:
define a new process workflow in the mashup; and
modify an existing process workflow in the mashup.

8. The computer-implemented method as recited in claim 7, wherein receiving the one or more modifications comprises receiving particular design information, wherein the particular design information specifies that a first process workflow in the mashup is to be used by a second process workflow in the mashup.

9. The computer-implemented method as recited in claim 5, wherein refactoring the mashup further comprises automatically modifying the one or more current versions of the one or more design elements.

10. The computer-implemented method as recited in claim 9, wherein automatically modifying the one or more current versions of the one or more design elements comprises:
automatically renaming the one or more design elements; and
automatically identifying and modifying any design elements, included in the current version of the mashup, that are affected by renaming the one or more design elements.

11. The computer-implemented method as recited in claim 1, further comprising:
receiving, from the user, particular design information that includes a renaming change to at least one of the plurality of design elements;
automatically inspecting the first versioning information to determine one or more current versions of one or more design elements, of the plurality of design elements, that are affected by the renaming change; and automatically modifying the one or more current versions of the one or more design elements to reflect the renaming change.

12. The computer-implemented method as recited in claim 1, further comprising:
automatically maintaining in the repository second versioning information that associates at least one previous version of the mashup with previous versions of the plurality of design elements;
receiving, from the user, particular design information that includes a renaming change to at least one of the plurality of design elements;
automatically inspecting the first versioning information and the second versioning information to determine any current and previous versions of one or more design elements, of the plurality of design elements, that are affected by the renaming change; and
automatically modifying the current and the previous versions of the one or more design elements to reflect the renaming change.

13. One or more non-transitory computer-readable storage media
comprising instructions which, when processed by one or more processors, cause:
receiving, from a user, design information that defines or modifies a plurality of design elements included in a mashup, wherein the mashup is a composite business application that is operable to integrate and present data obtained from multiple external services;
without receiving directly from the user any input that causes the plurality of design elements to be versioned, automatically storing in a repository current versions of the plurality of design elements when the plurality of design elements are saved during development of the mashup;
deploying the mashup to one or more servers;
in response to the mashup being deployed to the one or more servers, without receiving any input from the user that causes the mashup to be versioned;
automatically storing in the repository a current version of the mashup; and
automatically generating and storing in the repository first versioning information that associates the current version of the mashup with the current versions of the plurality of design elements that are included in the mashup;
wherein the multiple external services comprise a web service;
wherein the plurality of design elements include a contract, wherein the contract includes a Web Services Description Language (WSDL) definition that describes the web service;
wherein automatically storing in the repository the current versions of the plurality of design elements comprises automatically storing in the repository a current version of the contract for the web service;
determining that the WSDL definition in the contract for the web service has changed;
in response to determining that the WSDL definition in the contract for the web service has changed and based on the first versioning information, determining one or more design elements, of the plurality of design elements, that need to be changed; and
notifying the user that the one or more design elements need to be changed because the WSDL definition in the contract for the web service has changed.

14. The one or more non-transitory computer-readable storage media as recited in claim 13, wherein:
the plurality of design elements includes:
one or more data elements that are provided by one or more web services of the multiple external services; and
one or more process elements that define a process workflow that integrates the plurality of design elements to provide a result of the composite business application.

15. The one or more non-transitory computer-readable storage media as recited in claim 13, wherein the instructions further comprise instructions which, when processed by the one or more processors, cause:
automatically maintaining in the repository at least one previous version of the mashup, one or more previous versions of one or more of the plurality of design elements, and second versioning information that associates the at least one previous version of the mashup with the one or more previous versions of the one or more of the plurality of design elements; and
inspecting the first versioning information and the second versioning information to determine which design elements, of the plurality of design elements, have been added, modified, or deleted in the current version of the mashup.

16. The one or more non-transitory computer-readable storage media as recited in claim 13, wherein the instructions that cause automatically storing in the repository the current versions of the plurality of design elements are performed in response to user input that causes the plurality of design elements to be checked-in and saved into a configuration management system.

17. The one or more non-transitory computer-readable storage media as recited in claim 13, wherein the instructions further comprise instructions which, when processed by the one or more processors, cause:
while the mashup is being executed at the one or more servers, receiving runtime information associated with the plurality of design elements; and
refactoring the mashup based on the runtime information, wherein refactoring the mashup comprises:
based on the runtime information, inspecting the first versioning information to determine one or more current versions of one or more design elements included in the plurality of design elements.

18. The one or more non-transitory computer-readable storage media as recited in claim 17, wherein the instructions that cause refactoring the mashup further comprise instructions which, when processed by the one or more processors, cause:
notifying the user of the runtime information and of the one or more current versions of the one or more design elements; and
receiving, from the user, one or more modifications to the one or more current versions of the one or more design elements.

19. The one or more non-transitory computer-readable storage media as recited in claim 18, wherein the instructions that cause receiving the one or more modifications comprise instructions which, when processed by the one or more processors, cause receiving particular design information that defines one or more new design elements, wherein the one or more new design elements are operable to perform one or more of:
define a new process workflow in the mashup; and
modify an existing process workflow in the mashup.

20. The one or more non-transitory computer-readable storage media as recited in claim 18, wherein the instructions that cause receiving the one or more modifications comprise instructions which, when processed by the one or more processors, cause receiving particular design information, wherein the particular design information specifies that a first process workflow in the mashup is to be used by a second process workflow in the mashup.

21. The one or more non-transitory computer-readable storage media as recited in claim 17, wherein the instructions that cause refactoring the mashup further comprise instructions which, when processed by the one or more processors, cause automatically modifying the one or more current versions of the one or more design elements.

22. The one or more non-transitory computer-readable storage media as recited in claim 21, wherein the instructions that cause automatically modifying the one or more current versions of the one or more design elements comprise instructions which, when processed by the one or more processors, cause:
- automatically renaming the one or more design elements; and
- automatically identifying and modifying any design elements, included in the current version of the mashup, that are affected by renaming the one or more design elements.

23. The one or more non-transitory computer-readable storage media as recited in claim 13, wherein the instructions further comprise instructions which, when processed by the one or more processors, cause:
- receiving, from the user, particular design information that includes a renaming change to at least one of the plurality of design elements;
- automatically inspecting the first versioning information to determine one or more current versions of one or more design elements, of the plurality of design elements, that are affected by the renaming change; and
- automatically modifying the one or more current versions of the one or more design elements to reflect the renaming change.

24. The one or more non-transitory computer-readable storage media as recited in claim 13, wherein the instructions further comprise instructions which, when processed by the one or more processors, cause:
- automatically maintaining in the repository second versioning information that associates at least one previous version of the mashup with previous versions of the plurality of design elements;
- receiving, from the user, particular design information that includes a renaming change to at least one of the plurality of design elements;
- automatically inspecting the first versioning information and the second versioning information to determine any current and previous versions of one or more design elements, of the plurality of design elements, that are affected by the renaming change; and
- automatically modifying the current and the previous versions of the one or more design elements to reflect the renaming change.

\* \* \* \* \*